United States Patent
Riskin et al.

(10) Patent No.: US 11,254,569 B2
(45) Date of Patent: Feb. 22, 2022

(54) METHOD AND DEVICE FOR CONVERSION OF WATER INTO HYDROGEN PEROXIDE

(71) Applicant: OXYPRO LTD., Katzrin (IL)

(72) Inventors: Yefim Riskin, Katzrin (IL); Leonid Riskin, Ma'alot-Tarshiha (IL)

(73) Assignee: OXYPRO LTD., Katzrin (IL)

( * ) Notice: Subject to any disclaimer, the term of this patent is extended or adjusted under 35 U.S.C. 154(b) by 0 days.

(21) Appl. No.: 16/982,848

(22) PCT Filed: Mar. 26, 2019

(86) PCT No.: PCT/IL2019/050352
§ 371 (c)(1),
(2) Date: Sep. 21, 2020

(87) PCT Pub. No.: WO2019/186555
PCT Pub. Date: Oct. 3, 2019

(65) Prior Publication Data
US 2021/0053826 A1 Feb. 25, 2021

(30) Foreign Application Priority Data
Mar. 26, 2018 (IL) .......................... 258383

(51) Int. Cl.
*C01B 15/027* (2006.01)
*H01T 19/00* (2006.01)
(Continued)

(52) U.S. Cl.
CPC .......... *C01B 15/027* (2013.01); *C25B 11/034* (2021.01); *H01T 19/00* (2013.01); *H05H 1/473* (2021.05); *B01J 2219/0818* (2013.01)

(58) Field of Classification Search
CPC ................... C01B 15/027; H05H 1/473; B01J 2219/0818; C25B 11/034
(Continued)

(56) References Cited

U.S. PATENT DOCUMENTS 9,610,559 B2 * 4/2017 Riskin .................... B01J 19/088
9,988,170 B2 * 6/2018 Sato ........................ A61L 2/14
(Continued)

FOREIGN PATENT DOCUMENTS

CN 108264026 7/2018

OTHER PUBLICATIONS

Lukes et al., "Hydrogen Peroxide and Ozone Formation in Hybrid Gas—Liquid Electrical Discharge Reactors," IEEE Transactions on Industry Applications, vol. 40, No. 1, pp. 60-67, DOI:10.1109/TIA.2003.821799 ; Jan./Feb. 2004.
(Continued)

*Primary Examiner* — Kevin R Steckbauer
(74) *Attorney, Agent, or Firm* — The Law Office of Joseph L. Felber

(57) ABSTRACT

In a method and device for conversion of water into hydrogen peroxide ($H_2O_2$), a corona discharge zone is generated between a first electrode (10) and a second electrode (6) one of which is insulated and another of which is not insulated and wherein a respective surface of each of the electrodes face one another. The first electrode (10) is rotated so as to induce relative rotation between the first electrode and the second electrode; and liquid water is conveyed on to a surface of the first electrode facing the second electrode close to the axis of rotation (4) of the first electrode whereby the liquid water advances outward through the corona discharge zone towards a periphery of the first electrode under the action of centrifugal force caused by rotation of the first electrode.

13 Claims, 1 Drawing Sheet

(51) Int. Cl.
*H05H 1/24* (2006.01)
*C25B 11/034* (2021.01)

(58) Field of Classification Search
USPC .......................................................... 204/175
See application file for complete search history.

(56) References Cited

U.S. PATENT DOCUMENTS

| | | | | |
|---|---|---|---|---|
| 10,138,562 | B2* | 11/2018 | Riskin | ..................... C25B 15/08 |
| 10,669,169 | B2* | 6/2020 | Pemen | ................... C02F 1/4618 |
| 2016/0175803 | A1* | 6/2016 | Riskin | ..................... B01J 19/088 |
| | | | | 204/175 |
| 2017/0217617 | A1* | 8/2017 | Sato | .......................... A61L 2/22 |
| 2017/0335471 | A1* | 11/2017 | Riskin | ..................... C25B 15/08 |
| 2018/0327283 | A1* | 11/2018 | Pemen | ................... C02F 1/4618 |
| 2021/0046210 | A1* | 2/2021 | Riskin | ..................... H01T 23/00 |
| 2021/0053826 | A1* | 2/2021 | Riskin | ..................... H01T 19/00 |

OTHER PUBLICATIONS

Bruggeman et al. "Non-thermal plasmas in and in contact with liquids," J. Phys. D: Appl. Phys. vol. 42, No. 5, # 353001, pp. 1-28, DOI:10.1088/0022-3727/42/5/053001, Feb. 17, 2009.

* cited by examiner

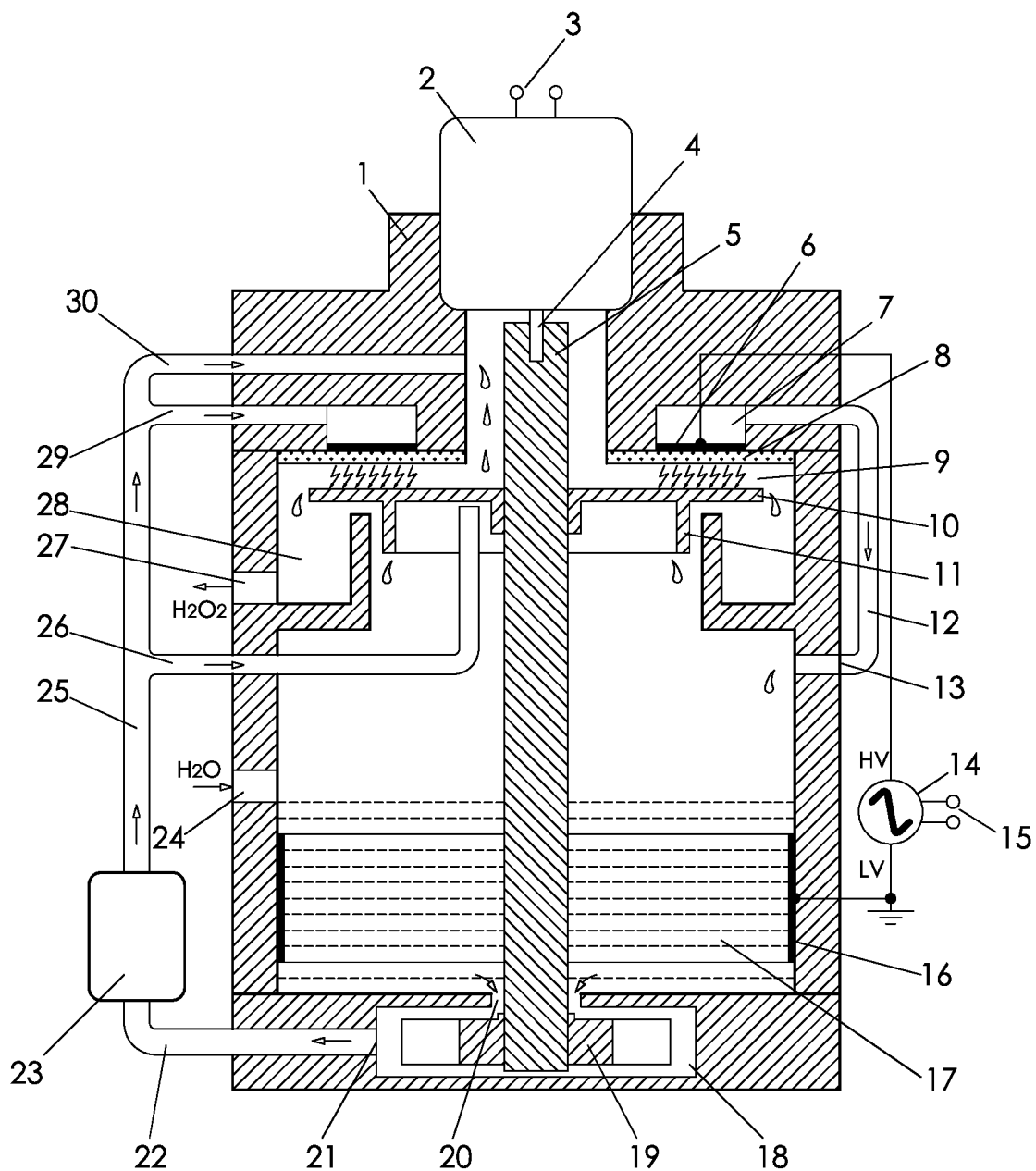

METHOD AND DEVICE FOR CONVERSION OF WATER INTO HYDROGEN PEROXIDE

FIELD OF THE INVENTION

This invention relates to methods and devices for generation of hydrogen peroxide ($H_2O_2$) suitable for industrial and domestic applications.

BACKGROUND OF THE INVENTION

U.S. Pat. No. 9,610,559 and US 2017/0335471 disclose devices for conversion of water to $H_2O_2$ based on the principle of conversion of water vapor into $H_2O_2$ by conveying water vapor through a corona discharge zone generated between a pair of electrodes with at least one of them being insulated.

A drawback of such devices is that it is impossible to use regular non-distilled tap water to generate vapor because some groups of vapor molecules evaporate upon interaction with the corona discharge streamers whose temperature reaches 800° C.

As a result Ca and Mg salts dissolved in water transfer to the solid phase and settle on the electrodes as scale deposit, requiring periodic cleaning of the electrodes.

The inability to use regular water for conversion into $H_2O_2$ significantly reduces the number of possible applications, such as disinfection of vegetables, fruit, berries and flowers, greenhouses and stationary and mobile food refrigerators, i.e. when the use of large quantities of distilled water increases the cost of the process.

According to the existing theory in conversion of water to $H_2O_2$ using corona discharge only 5% of the total energy is used directly for generation of $H_2O_2$ with heat loss amounting to 95% of the total consumed energy.

Therefore one of the issues in producing high-concentration $H_2O_2$ which is a high energy consuming process is the intense dissipation of heat from the limited surface of the electrodes.

SUMMARY OF THE INVENTION

An objective of the invention is to extend the fields of its use along with simplifying the converter.

The purpose in view is achieved in the first place by abandoning the use of water vapor for conversion into $H_2O_2$ and instead disposing a water layer over one of the electrodes along the side facing the other electrode so as to preserve an air gap between the upper water layer and the other electrode inside which corona discharge takes place.

Hence, a layer of water and a layer of air are simultaneously conveyed through the corona discharge zone.

The entire corona discharge current flows through the water layer which is actually used as an electrode.

In the proposed method the electrode to which water is supplied is rotated relative to the other stationary electrode, while water is supplied to the rotating electrode close to its axis of rotation.

Owing to a change of the direction angle in the direct segment of the corona discharge under the action of the centrifugal force, the liquid flow advances towards the electrode edges as a layer whose thickness is determined by the water amount, the electrode surface and its rotation velocity.

Water removal from the rotating electrode occurs when the small dispersion drops are detached from the electrode edges by the centrifugal force. Therefore in order to avoid evaporation of small dispersion drops in the corona discharge the atomization is performed outside the corona discharge limits.

In practice it is only required that the outer diameter of the rotating electrode is larger than the outer diameter of the stationary electrode.

The invention solves the problem of intense heat removal from the electrodes at increasing intensity of the corona discharge in order to receive high concentration of $H_2O_2$ together with simplification of the converter.

In one embodiment, the solution is based on the idea of the use of a single liquid container to supply liquid to the electrodes for its conversion into $H_2O_2$ and also to cool them.

Moreover the liquid used for cooling the electrodes is removed into the container.

Since the liquid is heated in the container the supplied liquid is passed through an external cooler.

At the same time the liquid in the container is used to transmit the low potential from the high AC voltage generator to the rotating electrode during the electrolysis between the low potential terminal and rotating electrode.

The use of a single container of liquid simultaneously supplied to cool the high potential and low potential electrodes a resistive decoupling is required.

The decoupling is accomplished by liquid supply to the high potential electrode and the liquid removal to the container via channels made from electrically insulating materials where the liquid is used as a resistor. A channel with a length of 10 cm and an internal diameter of 1.5 mm has a resistance of 10 MΩ.

A converter realizing the method according to the invention contains a body comprising the upper, the center and lower parts.

The upper part holds an electric motor with power supply terminals and an axis with an axle fastened to it, a high potential stationary electrode with a cooling contour and channels for cooling liquid supply to the cooling contour and for the cooling liquid removal from the cooling contour, an insulator underlying the high potential electrode, a rotating electrode with deviating wall fastened to the axle and a channel for liquid supply to the side of the rotating electrode facing the high potential electrode.

The center of the body holds a $H_2O_2$ collector, an hole for $H_2O_2$ removal outside the converter, a channel for cooling liquid supply to the side of the rotating electrode facing the high potential electrode, a liquid inlet ($H_2O$) to the container located in the lower part of the body and a hole for liquid removal from the channel for the cooling liquid removal from the cooling contour to this container.

In addition the lower part of the body holds a compressor with an inlet and outlet openings and a rotor fastened to the lower part of the axle.

Outside the body is a high AC voltage generator with voltage supply terminals and a high potential output connected to the high voltage electrode and a low potential output connected to the low potential terminal mounted in the lower part of the body in the liquid container.

Further, an external cooler is located outside the body whose input is connected via a channel to the compressor output and the cooler output is via a distribution channel connected to the channel for liquid supply to the electrodes.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 1 illustrates schematically a device according to an embodiment of the invention for converting water to $H_2O_2$.

DETAILED DESCRIPTION OF EMBODIMENTS

Referring to the FIGURE there is shown a device according to an embodiment of the invention for converting water to $H_2O_2$. The device comprises the following parts: body 1, electric motor 2 with feeding terminals 3 and axis 4, an axle 5 formed of electrically conductive material fastened to the axis 4, high potential stationary electrode 6, cooling contour 7 of electrode 6, insulator 8, a disk-shaped rotating electrode 10 with deflecting wall 11, which constitutes a first electrode, fastened to the axle 5 and in electrically conductive contact therewith, channel 12 for removal of the cooling liquid from the contour 7, outlet 13 for the cooling liquid removal from contour 7 to the liquid container 17, high AC voltage generator 14 with power supply terminals 15, low potential terminal 16 mounted in the liquid container 17, compressor 18 with impeller 19 fastened to the lower part of the axle 5, inlet 20 of the compressor 18 and its outlet 21, inlet channel 22 of the external cooler 23 connected to the outlet 20 of the compressor 18, opening 24 constituting a water inlet for liquid supply to the container 17, distribution channel 25 connected to the outlet of the external cooler 23 and channels 26, 29 and 30 for the liquid supply to the electrodes 6 and 10, collector 28 for $H_2O_2$ removal and an outlet 27 for $H_2O_2$ removal from the collector 28 outside the converter.

The converter operation is as follows:

$H_2O$ is supplied to the container 17 via the opening 24, to fill the container 17 to the level below the level of the bottom of the $H_2O_2$ collector 28.

Then power is supplied to the motor 2 via terminals 3 and power is supplied to high AC voltage generator 14 via terminals 15.

Since the high voltage output of the high AC voltage generator 14 is connected to the high potential electrode 6, which constitutes a second electrode, and the low voltage output of the generator 14 is connected to the low potential terminal 16 and is electrically coupled via the liquid in the container 17 to the electrode 10, a barrier corona discharge zone 9 is generated between the insulator 8 and the rotating electrode 10.

As the motor 2 is started, the compressor 18 is activated to which liquid supply is initiated from the container 17 through the outlet 20. Rotation of the impeller 19 of the compressor 18 generates centrifugal force causing the liquid from the container 17 to flow under pressure from the outlet 21 of the compressor 18 via the channel 22 to the input of the external cooler 23.

The cooled liquid flows from the output of the cooler 23 via the distribution channel 25 and the channel 30 supplied to the side of the rotating electrode 10 facing the insulator 8 to the area close to the axis of the rotating electrode 10. This liquid is distributed by the centrifugal force generated during rotation of the electrode 10 over the surface of the electrode 10 in a layer whose thickness depends on the liquid amount, the surface of the electrode 10 and its rotation velocity.

The rotating liquid layer is advanced to the disk edge owing to the liquid detachment from the edges of the electrode 10, under the action of the centrifugal force this water layer is converted into small dispersed drops which fall into the container 28 where they form liquid $H_2O_2$ which is removed outside the converter via the outlet 24.

Simultaneously the liquid from the container 17 is conveyed via the external cooler 23 and the channels 25 and 29 to the cooling contour 7 of the high potential electrode 6 from where it returns to the container 17 via the channel 12 and the opening 13 in the center of the body 1.

At the same time the liquid from the container 17 via the cooler 23 and the channels 25 and 26 reaches also the side of the rotating electrode 10 not facing the insulator 8.

The liquid is distributed over the electrode 10 owing to its rotation, cools it and returns to the container 17 because of the wall 11 which actually prevents this liquid from mixing with the liquid converted into $H_2O_2$ which reaches the container 28.

Since the liquid amount in the container 17 is continually reduced by the amount of $H_2O_2$ reaching the container 28, the liquid level in the container 17 must be maintained constant during operation by an external dosimeter operating in a constant or pulsating mode. Keeping the liquid level constant during the full work cycle of the converter is a basic requirement as described, for example, in US 2017/0335471, to which further reference may be made.

$H_2O_2$ can be removed from the container 28 either continuously or periodically depending on the volume of the container 28. Since the body 1 of the converter does not have air inlet and outlet openings ozone ($O_3$) generated in the corona discharge zone 9 circulates inside the body 1 without reaching the environment.

The inventors have constructed a development prototype of the converter with the following specifications:

| | | |
|---|---|---|
| 1. | Material of insulation layer | Glass |
| 2. | Distance between the electrodes | 1 mm |
| 3. | The electrode rotation velocity | 2000 RPM |
| 4. | The AC voltage source amplitude | ±5 kV |
| 5. | The AC voltage source frequency | 40 kHz |
| 6. | Water consumption | 300 mL/h |
| 7. | $H_2O_2$ concentration at the converter outlet | 100 ppm |

The concentration of $H_2O_2$ is a function of the supplied power, 95% of which is wasted as heat with only 5% contributing to the generation of $H_2O_2$. Therefore, in order to produce a high concentration of $H_2O_2$ as proposed (100 ppm), a large amount of waste heat is formed and must be dissipated. The best way to achieve this in practice is by some form of cooling as described. However, a manufacturer or end-user able to suffice with a much smaller concentration such as only 2 ppm, can reduce the power by reducing the current proportionately i.e. by a factor of 50 relative to that required for a concentration of 100 ppm. The heating effect is then significantly reduced whereby it may be possible to achieve sufficient cooling by the ambient air flow without the need for external cooling.

The invention claimed is:

1. A method for conversion of water into hydrogen peroxide ($H_2O_2$), the method comprising:
   generating a corona discharge zone between a first electrode and a second electrode one of which is insulated and another of which is not insulated and wherein a respective surface of each of the electrodes face one another;
   rotating the first electrode so as to induce relative rotation between the first electrode and the second electrode; and
   conveying liquid water on to a surface of the first electrode facing the second electrode close to the axis of rotation of the first electrode whereby the liquid water advances outward through the corona discharge zone towards a periphery of the first electrode under the action of centrifugal force caused by rotation of the first electrode.

2. The method according to claim 1, wherein removal of $H_2O_2$ from the surface of the first electrode is accomplished through atomization of $H_2O_2$ from the edges thereof.

3. The method according to claim 2, wherein $H_2O_2$ is atomized outside the corona discharge zone.

4. The method according to claim 1, including cooling the electrodes using cooling liquid supplied to the respective surfaces of the electrodes not facing each other.

5. The method according to claim 4, wherein the liquid water discharged on to the first electrode and the cooling liquid are supplied from a common container through an external cooler.

6. The method according to claim 5, wherein the cooling liquid is returned to said container.

7. The method according to claim 4, including supplying and removing the cooling liquid for cooling the electrode to which high voltage is applied through channels made from an electrically insulating material.

8. A device for converting water into hydrogen peroxide ($H_2O_2$), the device comprising:

a hollow body containing toward an upper end thereof a pair of electrodes one of which is insulated and another of which is not insulated and wherein a respective surface of each of the electrodes face one another across a gap between said surfaces such that when a high AC voltage is applied across the electrodes a corona discharge zone is generated in the gap, a first one of the electrodes being disk-shaped and concentrically fastened to an axle that is formed of electrically conductive material and is rotatably coupled to a shaft of an electric motor mounted in the upper end of the body, a second one of the electrodes being mounted on an insulator and being configured for connection thereto of a high voltage output of a AC voltage generator, an outer diameter of the first electrode being larger than an outer diameter of the second electrode, a water container in a lower end of the body, an $H_2O_2$ outlet intermediate the water container and the electrodes for removal of $H_2O_2$ outside the device, a water inlet in said hollow body for supplying water to the container, and an electrical terminal located inside the body toward the lower end thereof and configured for connecting a low voltage output of the AC voltage generator; wherein liquid water is conveyed on to a surface of the first electrode facing the second electrode close to the axis of rotation of the first electrode whereby the liquid water advances outward through the corona discharge zone towards a periphery of the first electrode under the action of centrifugal force caused by rotation of the first electrode.

9. The device according to claim 8, wherein electrode cooling liquid is supplied to respective surfaces of the electrodes not facing each other.

10. The device according to claim 8, further comprising a compressor for supplying and removing cooling liquid for cooling the electrode to which high voltage is applied through channels made from an electrically insulating material.

11. The device according to claim 8, further including an external cooler for receiving water from said container and supplying cooled liquid for conversion to $H_2O_2$ as well as liquid for cooling the electrode surfaces.

12. The device according to claim 10, including channels formed of an electrically insulating material for delivery and removal of liquid for cooling the electrode to which high voltage is supplied.

13. The device according to claim 11, including channels formed of an electrically insulating material for delivery and removal of liquid for cooling the electrode to which high voltage is supplied.

* * * * *